May 27, 1969    S. LINDERHOLM ET AL    3,445,903
METHOD AND DEVICE FOR MANUFACTURING CYLINDRICAL CAPACITORS
Filed Oct. 13, 1965
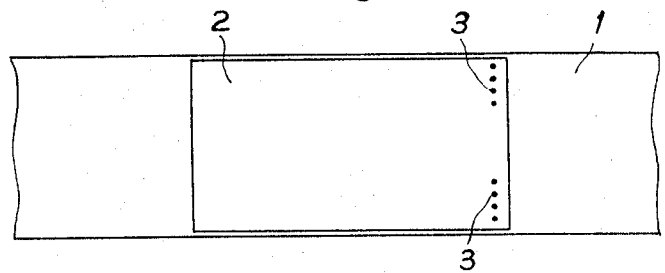
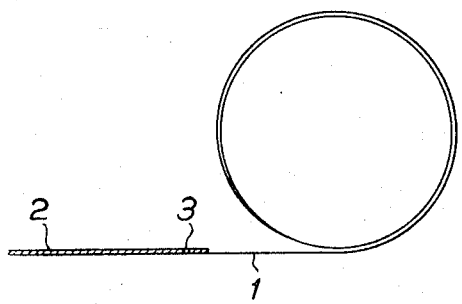
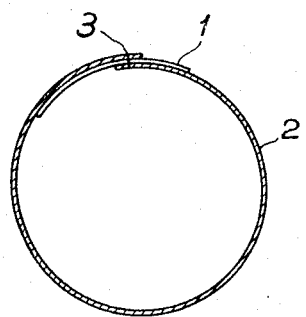
INVENTORS
SVEN LINDERHOLM
BIRGER DISER
BY Bailey, Stephens + Huettig
ATTORNEYS United States Patent Office 3,445,903
Patented May 27, 1969

3,445,903
METHOD AND DEVICE FOR MANUFACTURING CYLINDRICAL CAPACITORS
Sven Linderholm and Birger Diser, Ludvika, Sweden, assignors to Allmänna Svenska Elektriska Aktiebolaget, Vasteras, Sweden, a corporation of Sweden
Filed Oct. 13, 1965, Ser. No. 495,382
Claims priority, application Sweden, July 19, 1965, 9,489/65
Int. Cl. H01g *13/02;* H01d *17/28;* B21d *51/10*
U.S. Cl. 29—25.42                                    1 Claim

ABSTRACT OF THE DISCLOSURE

In a method of manufacturing condenser bushings comprising a number of cylindrical capacitor plates, the circumferential length of each such plate is somewhat greater than the corresponding circumference of the bushing so that the two ends of the plate overlap each other. Before the plate is wound into the bushing, the plate end which is first rolled up is provided with perforations, thereby forming flaps from the plate material. These flaps penetrate the insulating layer and make contact with the other end of the plate when this is completely wound around the bushing.

---

During the manufacture of condenser electrodes with paper of the same width as the length of the condenser core insulation and with capacitor plates of metal foil, the length of each foil is usually chosen to be somewhat greater than the circumference of the capacitor, so that the ends of the foil overlap each other somewhat. Between the ends of the foil there will thus be one layer of paper. During normal operating conditions, the whole foil has the same potential and thus there is no voltage across the insulation layer between the ends of the foil.

When the electrode is subjected to an impulse, especially a chopped wave impulse, the voltage between the beginning and the end of a foil can rise so quickly and to such a high value that a breakdown may occur through the intermediate paper layer. This does not mean anything in itself, since the two ends of the foil will have the same voltage in service, but adjoining paper insulation layers may be damaged, which later on can lead to detrimental breakdowns.

The present invention relates to a method and a device useful during the manufacture of cylindrical capacitors, particularly condenser bushings or electrodes, for making an electrical connection between two layers lying one above the other and insulated from each other, and belonging to the same capacitor coating plate. The method is characterized in that the capacitor plate and the insulating layer lying between the beginning and the end of the plate are provided with one or more perforations in such a way that flaps of the plate foil which are formed during the perforation of the coating penetrate the insulating layer and make contact with the other end of the plate foil. The device for carrying out the method is characterized by a mechanical perforation device provided with an electrical contact device with two sliding contacts, which slide against the paper in its path and which close an electrical circuit when they come in contact with the metal foil. The sensing of the position of the foil and the giving of impulses to the perforation device can also be carried out in other ways, for example with a photo electric device.

On the accompanying drawing, FIGURE 1 shows one of the metal foils of a condenser placed on the paper band and provided with the perforations. FIGURE 2 shows a foil on the paper immediately before the rolling and FIGURE 3 shows a foil plate rolled up.

The paper band 1 shown in FIGURE 1 has the same width as the finished capacitor. A metal foil 2 is placed on the paper. It has substantially the same width as the paper and its length is somewhat greater than the circumference of the capacitor during manufacture at the point where the foil is rolled up, so that the two ends of the foil overlap each other somewhat, the ends being separated in the radial direction by a layer of paper. In order to accomplish metallic contact between the two foil ends through the paper, a number of perforations 3 are made through the foil and paper at the end of the foil which is rolled up first. The perforations are made with a pointed tool, which suitably has such a form that all the perforations can be made at the same time and so that it forms flaps of the metal foil which extend through the paper so that they can make contact with the other end of the foil placed on the other side of the paper in the capacitor body.

FIGURE 2 shows the paper 1 with the foil 2 placed on it, which is provided with perforations 3 during the rolling together into a capacitor or condenser electrode.

FIGURE 3 shows a foil rolled into its place. It is clearly evident from the figure how the ends of the foil overlap each other with an intermediate paper layer and how the perforations connect the two foil ends.

The perforations can be made by hand or with a mechanical perforation device which is controlled by an electrical contact device. This can be provided with two sliding contacts which lie against the paper in its path and which close an electrical circuit when they come in contact with a foil lying in the path of the paper. Other devices are also feasible within the scope of the invention for effecting suitable perforations.

What is claimed is:
1. In a method of manufacturing a cylindrical condenser electrode for effecting electrical connection between two end portions belonging to the same capacitor plate and lying one above the other and insulated from each other by an insulating layer, characterized in that, during the manufacturing of the condenser electrode and before a capacitor plate is rolled up to form the condenser electrode, one end portion of the capacitor plate is provided with at least one perforation penetrating both the capacitor plate and the underlying insulating layer, thereby forming flaps from the capacitor material, and the plate is then wound into the condenser electrode, the said flaps penetrating the insulating layer making contact with the other end portion of the capacitor plate when the capacitor plate is so wound.

References Cited

UNITED STATES PATENTS

| | | | |
|---|---|---|---|
| 1,970,269 | 8/1934 | Benedek | 317—260 |
| 2,288,969 | 7/1942 | Kirkwood | 174—143 |
| 2,298,211 | 10/1942 | Guzik | 174—143 |
| 2,333,966 | 11/1943 | Weiss | 113—119 X |
| 2,476,429 | 7/1949 | Paules | 113—119 |
| 2,668,946 | 2/1954 | Bennett | 174—143 |
| 2,802,195 | 8/1957 | Martines | 113—119 |
| 3,127,789 | 4/1964 | Van De Loo | 113—116 X |
| 3,163,807 | 12/1964 | Linderholm | 174—73 X |

FOREIGN PATENTS

| | | |
|---|---|---|
| 616,046 | 1/1949 | Great Britain. |
| 535,669 | 9/1931 | Germany. |

JOHN F. CAMPBELL, *Primary Examiner.*

R. B. LAZARUS, *Assistant Examiner.*

U.S. Cl. X.R.

113—116, 119; 174—143; 317—260